United States Patent [19]

Bagalini

[11] Patent Number: 5,488,303
[45] Date of Patent: Jan. 30, 1996

[54] GFCI WITH AUXILIARY COIL CURRENT BLOCKING MEANS AND IMPROVED TEST BUTTON CONFIGURATION

[75] Inventor: Dante Bagalini, Johannesburg, South Africa

[73] Assignee: Circuit Breakers Industries Ltd., Johannesburg, South Africa

[21] Appl. No.: 455,597

[22] Filed: May 31, 1995

Related U.S. Application Data

[63] Continuation of Ser. No. 120,669, Sep. 13, 1993, abandoned.

[30]     Foreign Application Priority Data

Jul. 9, 1993 [ZA] South Africa ............................ 93/4962

[51] Int. Cl.⁶ ...................................................... H02H 3/26
[52] U.S. Cl. ................................. 324/509; 340/650; 361/45
[58] Field of Search ............................... 324/117 R, 127, 324/509, 510, 522, 541, 551; 340/650; 361/42, 45, 46

[56]            References Cited

U.S. PATENT DOCUMENTS 3,356,939  12/1967  Stevenson ................................. 324/509
3,891,895   6/1975  Wittlingen ................................ 324/509
3,978,400   8/1976  Pettit ....................................... 324/509
4,021,729   5/1977  Hudson, Jr. ............................... 324/509
4,037,155   7/1977  Ahmed ..................................... 324/509
4,180,841  12/1979  Engel ........................................ 361/45
4,598,331   7/1986  Legatti ..................................... 361/45

FOREIGN PATENT DOCUMENTS 2150374   6/1985   United Kingdom .................... 324/509

Primary Examiner—Kenneth A. Wieder
Assistant Examiner—Christopher M. Tobin
Attorney, Agent, or Firm—Ladas & Parry

[57]                ABSTRACT

A ground fault interrupter 10 includes a core 12. Two load current-carrying wires 14, 16 pass through the core 12. A primary coil 44 is carried on the core 12 for sensing a current imbalance in the wires 14, 16. An auxiliary coil 18 is wound on the core 12. A pair of back-to-back zener diodes 20 is connected in series with the coil 18 to supply current to the coil 18 when an applied voltage exceeds a predetermined value between wires 14 and 16 or between either one of the and ground.

11 Claims, 2 Drawing Sheets

GFCI WITH AUXILIARY COIL CURRENT BLOCKING MEANS AND IMPROVED TEST BUTTON CONFIGURATION

This is a continuation application Ser. No. 08/120,669 filed on Sep. 13, 1993, now abandoned.

FIELD OF THE INVENTION

This invention relates to a ground fault interrupter having an auxiliary coil.

SUMMARY OF THE INVENTION

According to the invention there is provided a ground interrupter having an auxiliary coil which includes
a core;
at least two load current-carrying wires which pass through the core;
a primary coil on the core for detecting a current imbalance in the current-carrying wires;
an auxiliary coil on the core; and
a means for supplying current through the auxiliary coil when an applied voltage exceeds a predetermined value, which is connected in series with the auxiliary coil.

It will be appreciated that, with a single phase system, in use, a live and neutral wire pass through the core. The auxiliary coil and current supply means may then be connected between the neutral supply cable and a ground of an electrical system with which the interrupter is used, between the live supply cable and the ground, or between the live and neutral supply cables. It will be appreciated that, if the auxiliary coil is connected between the neutral and ground the unit will trip if the voltage on the neutral line rises above a predetermined value, as can occur if the neutral voltage to ground exceeds a predetermined value, or if the neutral line is lost altogether i.e. is broken or disconnected. Similarly, if the auxiliary coil is connected between the live line and either ground or the neutral line, the unit will provide over-voltage protection.

It will be appreciated further by those skilled in the art that ground fault interrupters usually also have a test coil wound on the core by means of which the interrupter may be tested. Conveniently, the auxiliary coil may also be used for this purpose. Thus, the auxiliary coil may also be connected to a DC voltage supply (which may pulsate) via a test button. The test button may be in parallel with the current supply means.

The current supply means may conveniently comprise current blocking means in the form of a pair of back-to-back zener diodes in series with a current limiting resistor.

Further, the interrupter may have a DC supply means for supplying DC power to electronic components of the interrupter, the DC supply means being connected across the live and neutral wires.

BRIEF DESCRIPTION OF THE DRAWINGS

The invention is now described, by way of examples, with reference to the accompanying drawings, in which.

DETAILED DESCRIPTION OF THE DRAWINGS

Figure 1:
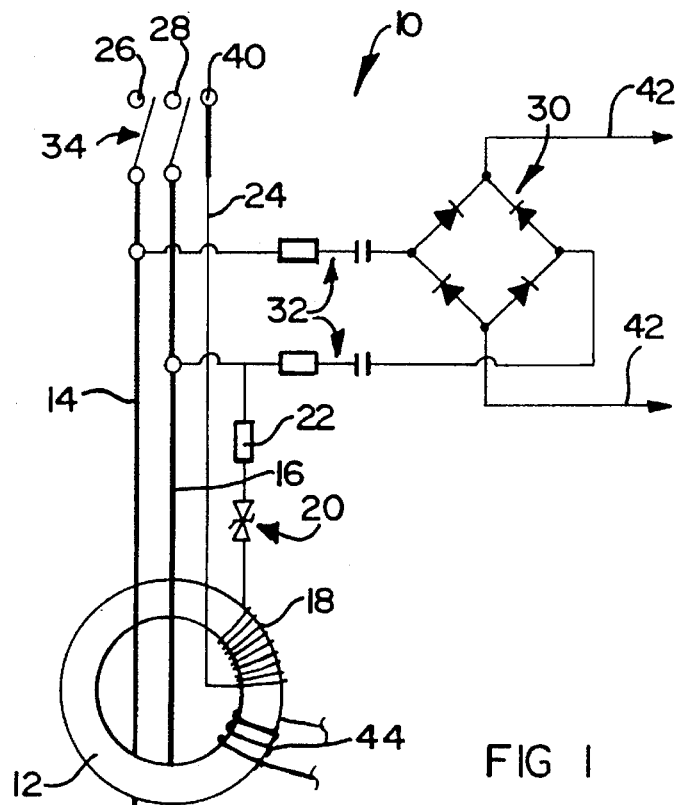
FIG. 1 is a schematic circuit diagram of a portion of a first embodiment of a ground fault interrupter in accordance with the invention.

Referring to FIG. 1, a ground fault interrupter in accordance with the invention is indicated generally by reference numeral 10. It must be appreciated that FIG. 1 does not show all the components of the ground fault interrupter. Only those components relevant to the present invention are shown.

As with conventional earth leakage units, the ground fault interrupters 10 shown in FIG. 1 has a core 12 through which a live wire 14 and a neutral wire 16 pass. The live wire 14 and neutral wire 16 are connected to input terminals 26 and 28 respectively via switch contacts 34. In use, the terminals 26 and 28 are connected to live and neutral supply cables. The live and neutral wires 14 and 16 are also connected to output terminals 36 and 38 which, in use, are connected to a load (usually via a circuit breaker).

The ground fault interrupter 10 has a further input terminal 40 which is connected, in use, to an earth of the electrical reticulation system.

A sensing coil 44 is wound on the core 12. The sensing coil 44 senses an imbalance in current in the wires 14 and 16.

The ground fault interrupter 10 further has an auxiliary coil 18 wound on the core 12. One end of the coil 18 is connected to the ground terminal 40 and the other to the neutral wire 16 via a resistor 22 and a pair of back-to-back zener diodes 20 connected in series with coil 18. The zener diodes act to block current flow through auxiliary coil 18 below a predetermined voltage difference between the neutral wire 16 and ground as explained later.

The ground fault interrupter 10 still further has a full wave rectifier 30 connected to the live wire 14 and neutral wire 16 via resistors and capacitors 32 and connected to electronic circuitry (not shown) via leads 42 to supply DC there to.

In use, if there is an imbalance in the current in the live wire 14 and neutral wire 16, this causes a magnetic field to be generated in the core 12 which induces a voltage in the sensing coil 44 which is detected by said electronic circuitry (not shown) and the contact switch 34 is open.

If the voltage on the neutral wire 16 increases, with respect to ground, above the predetermined value (as determined by the zener diodes 20) current flows through the auxiliary coil 18 which increases the magnetic field in the core 12. This is sensed by the sensing coil 44 and the contact switch 34 is opened.

Similarly, if the neutral supply line drops out i.e. is broken or disconnected, the current to the electronic circuitry via the rectifier 30 will flow to ground via the coil 18 and will also cause the ground fault interrupter 10 to open or trip.

Figure 2:
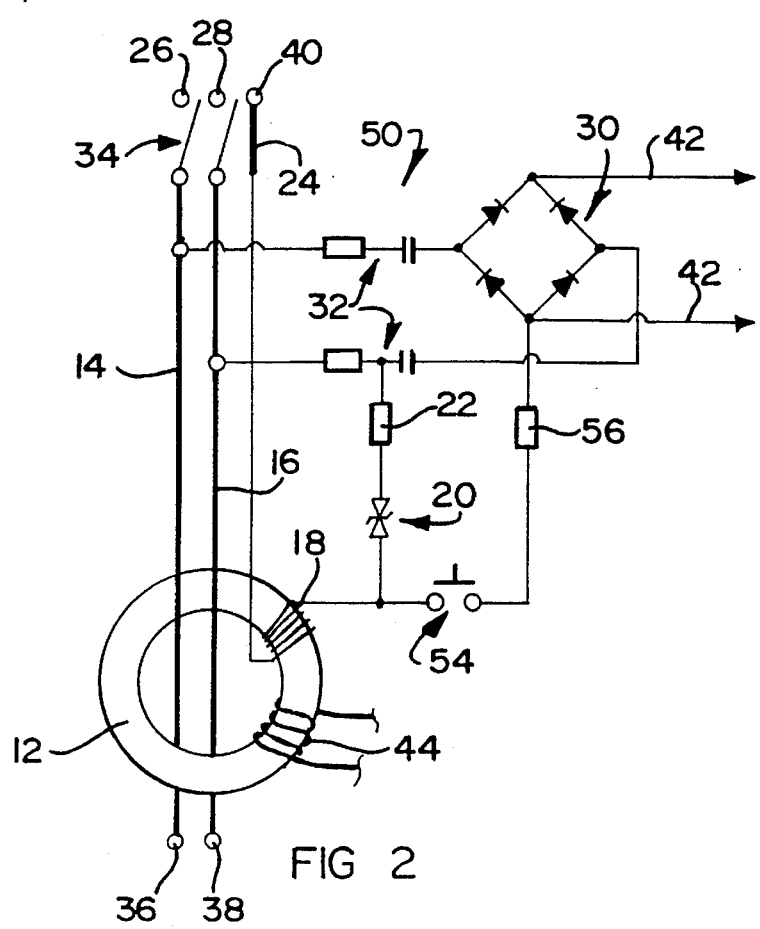
FIG. 2 is a schematic circuit diagram of a portion of a second embodiment of a ground fault interrupter in accordance with the invention.

Referring to FIG. 2 a further ground fault interrupter 50 is shown. This interrupter 50 is similar to the ground fault interrupter 10 shown in FIG. 1 and is referenced in a similar manner.

With the ground fault interrupter 50 shown in FIG. 2, the auxiliary coil 18 is also utilized to provide a test function. Thus, instead of providing a further coil, as is normally the case, which is connected to the rectifier 30 via a test button, the rectifier 30 is connected to the junction between the zener diodes 20 and the coil 18 via a push button switch 54 and a resistor 56. Further, the other side of the zener diodes 20 is connected to the neutral wire 16 via the smoothing resistor 32 instead of to the neutral wire 16 directly. If the switch 54 is closed, current flows through the coil 18 to ground, thereby simulating a fault and causing the ground fault interrupter 50 to trip.

Figure 3:
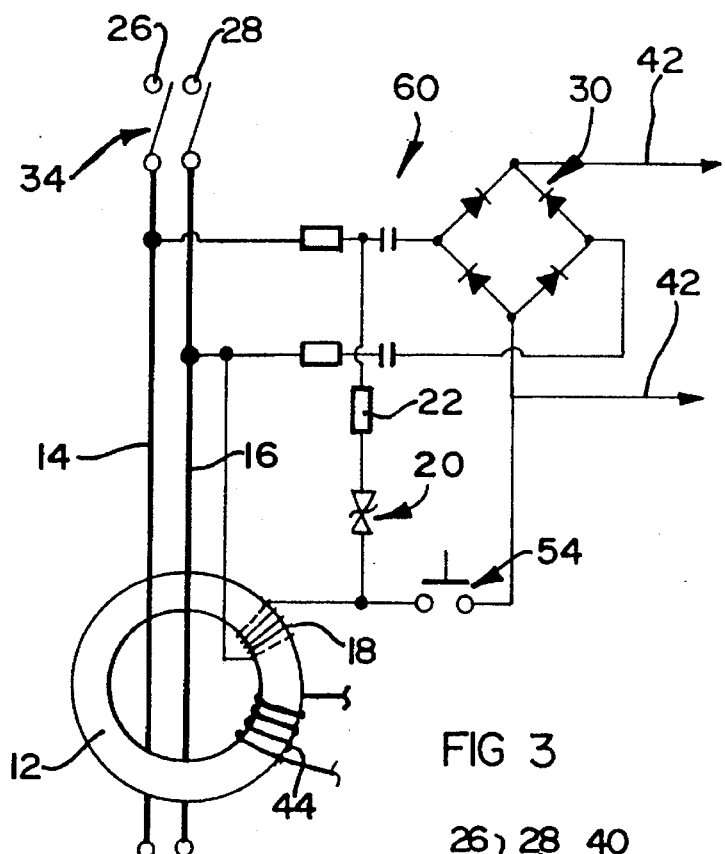
FIG. 3 is a schematic circuit diagram of a portion of a third embodiment of a ground fault interrupter in accordance with the invention.

Referring further to FIG. 3, a further embodiment of a ground fault interrupter in accordance with the invention is designated generally by reference numeral 60. This earth leakage unit 60 is similar to the ground fault interrupter 50 shown in FIG. 2. However, instead of the coil and its associated zener diodes 20 and resistor 22 being connected between ground and the neutral wire, they are connected between the live wire 14 and the neutral wire 16. Thus, if the supply voltage exceeds a predetermined value, current will flow through the auxiliary coil 18 and the earth leakage unit 60 will trip.

Figure 4:
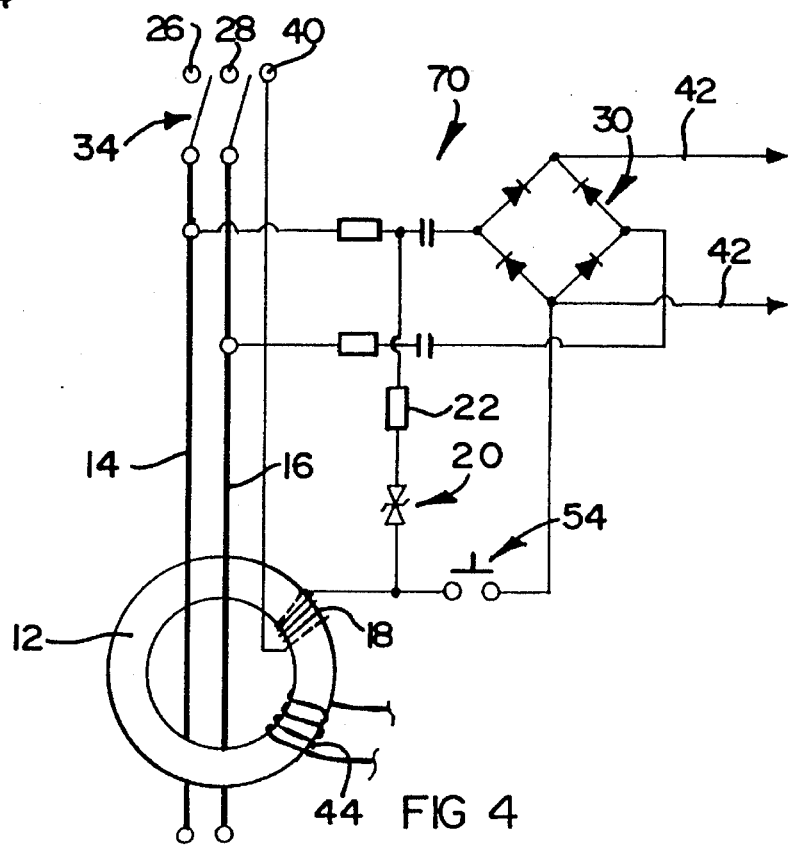
FIG. 4 is a schematic circuit diagram of a portion of a fourth embodiment of a ground fault interrupter in accordance with the invention.

The earth leakage unit 70 shown in FIG. 4 is the same as earth leakage unit 50 except that the coil 18, zener diodes 20 and resistor 22 are connected between the live wire and ground fault interrupter. With the embodiment of FIG. 4, the ground fault interrupter 70 will trip if the line supply voltage exceeds a predetermined value relative to ground.

Further, with the embodiments shown in FIGS. 2 and 4, the test button will not operate the unit if the earth is not connected or if it has a high resistance. This will show a potentially dangerous condition of the installation.

I claim:

1. A ground fault interrupter comprising:

a core;

a plurality of wires including at least two load current carrying wires, said load current carrying wires passing through the core, said load current carrying wires being connectable between electrical supply means and a load for supplying current to said load;

a primary coil on the core for detecting a current imbalance in said load current carrying wires;

an auxiliary coil on the core;

an electrical circuit connecting said auxiliary coil to first and second wires selected from said plurality of wires, said electrical circuit being operable to carry current to said auxiliary coil when a voltage exists between said first and second wires, and a current blocking means in said circuit to provide current flow to said auxiliary coil only when the voltage between said first and second wires exceeds a predetermined value, said current blocking means being connected in said circuit in series with said auxiliary coil between said first and second wires to be responsive to a voltage difference between said first and second wires;

a DC supply arrangement connected between a selected pair of said plurality of wires for supplying power to the DC supply arrangement; and a test button, said auxiliary coil having one end connected via said current blocking means to the first said wire and an opposite end connected to the second said wire, said second wire being a ground wire and said opposite end of the auxiliary coil being directly connected to said second wire; and said test button being connected between said one end of said auxiliary coil and said DC supply arrangement.

2. A ground fault interrupter as claimed in claim 1 for a single phase system wherein said load current carrying wires are two in number and comprise a live wire and a neutral wire.

3. A ground fault interrupter as claimed in claim 2, wherein said current blocking means comprises a pair of back-to-back zener diodes.

4. A ground fault interrupter as claimed in claim 1, wherein said first wire is the neutral wire.

5. A ground fault interrupter as claimed in claim 1, wherein said first wire is the live wire.

6. A ground fault interrupter as claimed in claim 1, wherein said test button is directly connected to said one end of said auxiliary coil.

7. A ground fault interrupter comprising:

a core;

a live input terminal for connection to a live supply cable;

a neutral input terminal for connection to a neutral supply cable;

a ground input terminal for connection to ground;

a live wire connected to the live input terminal at one end and connectable to a load at its other end;

a neutral wire connected to the neutral input terminal at one end and connectable to a load at its other end, the live and neutral wires passing through the core;

a primary coil on the core for detecting a current imbalance between the live and neutral wires;

an auxiliary coil on the core;

a current blocking device in series with the auxiliary coil for permitting a current flow through the auxiliary coil when a voltage is applied across the auxiliary coil and the current blocking device that is greater than a predetermined value;

the serially connected auxiliary coil and current blocking device being connected between said ground input terminal and one of said live and neutral input terminals such that current flows through the auxiliary coil only when the voltage between the ground input terminal and said one of said live and neutral input terminals exceeds said predetermined value;

said auxiliary coil having one end connected via said current blocking device to said one of said live and neutral input terminals and an opposite end connected directly to the ground input terminal;

a DC supply arrangement connected between the live and neutral wires; and a test button;

said test button being connected to said one end of said auxiliary coil and to said DC supply arrangement.

8. A ground fault interrupter as claimed in claim 7, wherein said current blocking device comprises a pair of back-to-back zener diodes.

9. A ground fault interrupter comprising:

a core;

a live input terminal for connection to a live supply cable;

a neutral input terminal for connection to a neutral supply cable;

a live wire connected to the live input terminal at one end and connectable to a load at its other end;

a neutral wire connected to the neutral input terminal at one end and connectable to a load at its other end, the live and neutral wires passing through the core;

a primary coil on the core for detecting a current imbalance between the live and neutral wires;

an auxiliary coil on the core;

a current blocking device in series with the auxiliary coil for permitting a current flow through the auxiliary coil when a voltage is applied across the auxiliary coil and the current blocking device that is greater than a predetermined value;

the serially connected auxiliary coil and current blocking device being connected between said live and neutral wires such that current flows through the auxiliary coil only when the voltage between the live and neutral wires exceeds said predetermined value;

a DC supply arrangement connected between the live and neutral wires; and a test button connected between the DC supply arrangement and the auxiliary coil;

said auxiliary coil having one end connected via said current blocking device to said live wire and an opposite end connected directly to said neutral wire.

10. A ground fault interrupter as claimed in claim 9, wherein said current blocking means comprises a pair of back-to-back zener diodes.

11. A ground fault interrupter as claimed in claim 9, wherein said test button is directly connected to said one end of said auxiliary coil.

* * * * *